Nov. 12, 1929.     J. J. AURYNGER     1,735,416
RADIO CONDENSER
Filed Sept. 8, 1922

John J. Aurynger
INVENTOR.

Patented Nov. 12, 1929

1,735,416

UNITED STATES PATENT OFFICE

JOHN J. AURYNGER, OF BROOKLYN, NEW YORK

RADIOCONDENSER

Application filed September 8, 1922. Serial No. 586,841.

The invention is related to devices using alternating currents of electricity which have a choking effect and have for their purpose the damping out of electrical oscillations as found in wireless telegraphy. It is well known that two or more condensers connected in series divide the voltage between them. This invention is for an improved condenser element which divides the voltage in a similar manner.

The object of this invention is a new type of condenser which will pass electric oscillations of a certain frequency and check the superposition of electric oscillations of different frequencies. This invention improves the condenser plates for the use of radiant energy. These improved condenser elements are for fixed plate condensers of a fixed capacity and for the movable plate condenser of a variable capacity.

The fundamental characteristics of all static condensers is an electrical attraction between two metallic plates separated by a dielectric. This invention introduces a new magnetic force or a new action at a distance. In addition to static charges in radio frequency condensers with broad metallic surfaces, thick plates are used to increase capacity and thin plates to decrease capacity. This theme was the subject of Hertz's experiments. Further reference to the text will be found in Hertz's "Electric Waves" in an article "On the mechanical action in wires". A brief statement is as follows:

The broadness and multiplicity of the plates contributes to the electric energy and the thinness of the plate increases the magnetic energy.

The magnetic force is overpowered by the electric force and is the basis for the variation in capacity due to thickness of the plates.

Each element of the condenser is separated from the other element by a dielectric medium. An element may consist of a single metallic plate or a series of connected plates. To each plate is fastened mechanically but insulated electrically from each other a plurality of auxiliary plates or metallic foils and forming a group unit. A number of the main plates may be connected to the terminal of the conducting plate. Several auxiliary plates joined together and fastened to the main conducting plate form a laminated condenser element. The main conducting plates and the insulated foils joined thereto without a terminal form a mixed element. With radiant energy the thickness of the condenser plate increases the capacity. An increase in the area of solid condenser plates with a dielectric between them when charged with radiant energy increases capacity in the same manner as the capacity increases in condensers charged with electric currents carried by wires. The insulated metallic foils dampen out electrical oscillations and choke back alternating currents of electricity. The voltage is divided between the conducting main plates which permits the use of high voltages of electricity and which are not used in a condenser having a solid condenser element.

The insulation between the parts of the condenser element which are the layers of main conducting plates and the insulated metallic foils may be mica, celluloid preparations, insulating enamels or any of the varnishes used for electrical purposes. The insulation between different condenser elements may be air, mica, oil or other materials having dielectric properties.

Fig. 2 shows a single layer of auxiliary plates joined to the main plate and Fig. 3 shows a double layer of auxiliary plates joined to the main plate both of which types can be made by the same method.

Figure 4:
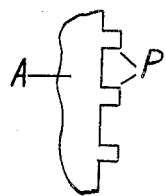

Fig. 4 further elucidates the method of fastening the main and auxiliary plates together by showing prongs on the edge of a main plate as "A".

Figure 1:
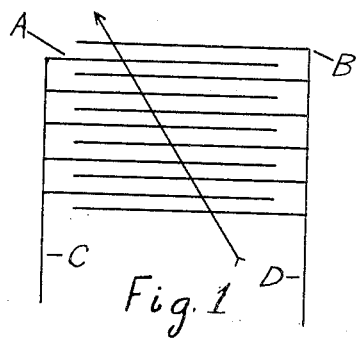
Fig. 1 shows a variable type of an electrical condenser which is most adapted to this invention.

Referring to the drawings by letters: Fig. 1 is a drawing which is the symbol used by the electrical arts for the illustration of all kinds of static condensers. The two static elements A and B are series of layers of metallic plates and insulated auxiliary plates. The layers of insulated plates or the laminæ of A and B elements are connected to the main plates which have terminals C and D respectively. The laminated condenser element is the main plates. Between the main plates are the insulated metallic foils without a terminal. The condenser elements composed of layers of metal plates may be of any suitable thickness. The thickness of the individual metal plates of the condenser elements when charged with radiant energy helps to determine the condenser capacity. The areas and shape of the elements conform with the frame which holds the elements and which operate with various uses in the electric arts.

Figures 2, 3:
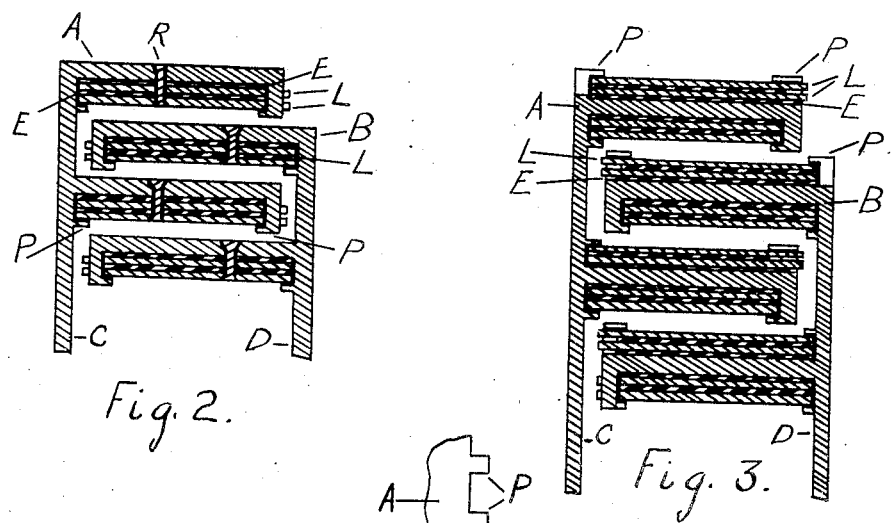
Figs. 2 and 3 are cross-section views of the plates "A" and "B" represented by Fig. 1.

Fig. 2 represents a cross section view of the improved condenser elements A and B. The insulated metallic foils are without a terminal and are joined to condenser plates A and B which may consist of one plate to an element or, one or more main plates to an element and a series of similar elements. The condenser elements A and B, each consist of layers of a plurality of main metallic plates and opposing insulated metallic foils, L, joined to a conducting plate. Several layers of aluminum foils .001 in. thick or other metals of suitable thickness are insulated from each other by insulation, E, which may be mica or insulating varnish. The dielectric between different condenser elements is also represented by E, which may be mica, air or oil.

Figs. 3, 4 and 5 represent mechanical means by means of which layers of insulated main plates which form the conducting elements A and B and the layers of insulated metallic foils, L, are joined together.

Fig. 2 is a representation of a modification of Fig. 1 by a cross section view enlarged. The auxiliary foil "L" are fastened to the main plates "A" and "B" and are held in place by the prongs "P" bent over the edges. The auxiliary plates "L" are placed on one side only of the main plates and form an intervening metallic layer between the main plate to which the laminæ are joined and the adjoining main plate of the condenser.

Fig. 3 is a representation of another modification of Fig. 1 by a cross section view also enlarged. The main plates of "A" and "B" are shielded by the auxiliary plates "L" which are placed on both sides of the main plates and fastened to them by the prongs "P." As a reinforcement to the bent over edge in holding the auxiliary plates and the main plate together rivets may be used.

Fig. 4 is a section of a main plate as A, showing the prongs on the main plate which are bent around the auxiliary plates. The auxiliary plates can be made to shield the edge of the main plates in case of high potentials by extending the auxiliary plates beyond the edge of the main plates.

The chief benefits derived from this invention are a condenser for high voltages and the damping out of electrical oscillations by choking back superposed oscillations.

I claim:

1. Electric condensers comprising a plurality of main plate elements of positive and negative potential spaced apart and insulated from each other, said plates being of uniform thickness and thin auxiliary plates associated with said main plates and directly fastened thereto, said condensers having a variable capacity in proportion to the relative thickness of said main plates and said auxiliary plates.

2. A condenser comprising a plurality of parallel conducting plates separated by a dielectric medium, certain of these plates being electrically connected to form a group of plates of one polarity when connected to a source of electric current, certain other plates electrically connected to form another group of plates of a different polarity, the plates of each group being so disposed with relation to the plates of the other group as to form a series of plates of alternate polarity, and other conducting plates adjacent certain of the plates composing the groups, said other plates being insulated from each other and from the group plates, each of said group plates and adjacent isolated conducting plates being riveted and pressed together by metallic compresses to form a group unit.

3. A condenser comprising a plurality of parallel conducting plates separated by a dielectric medium, certain of these plates being electrically connected to form a group of plates of one polarity when connected to a source of electric current, certain other plates electrically connected to form another group of plates of a different polarity, the plates of each group being so disposed with relation to the plates of the other group as to form a series of plates of alternate polarity, and other conducting plates adjacent each of the plates composing the groups, said other plates being insulated from each other and from the group plates and adjacent isolated conducting plates being riveted and pressed together by metallic compresses to form a group unit.

4. A condenser comprising a plurality of parallel conducting plates separated by a dielectric medium, certain of these plates being electrically connected to form a group of plates of one polarity when connected to a source of electric current, certain other plates electrically connected to form another group of plates of a different polarity, the plates of each group being so disposed with relation to the plates of the other group as to form a series of plates of alternate polarity, and other conducting plates so disposed that certain of the group plates have a plurality of these plates adjacent thereto, said other plates being insulated from each other and from the group plates, each of said group plates and adjacent isolated conducting plates being riveted and pressed together by metallic compresses to form a group unit.

5. A condenser comprising a plurality of parallel conducting plates separated by a dielectric medium, certain of these plates being electrically connected to form a group of plates of one polarity when connected to a source of electric current, certain other plates electrically connected to form another group of plates of a different polarity, the plates of each group being so disposed with relation to the plates of the other group as to form a series of plates of alternate polarity, and other conducting plates so disposed that each of the group plates have a plurality of these plates adjacent thereto, said other plates being insulated from each other and from the group plates, each of said group plates and adjacent isolated conducting plates being riveted and pressed together by metallic compresses to form a group unit.

JOHN J. AURYNGER.